May 29, 1934.   G. T. PFLEGER   1,960,506
AUTOMATIC BELT TENSIONING DEVICE
Filed Feb. 19, 1929
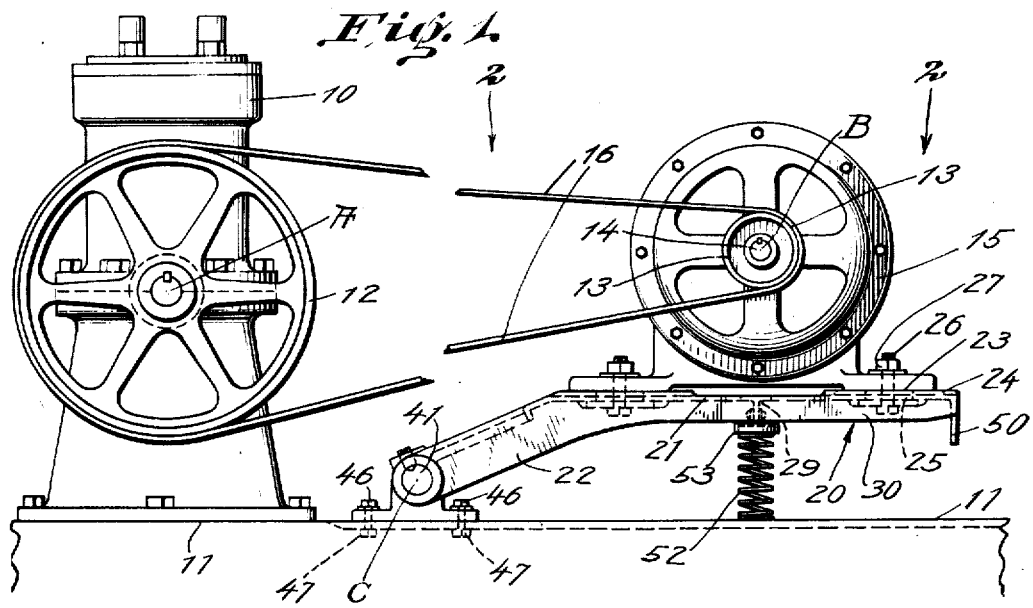
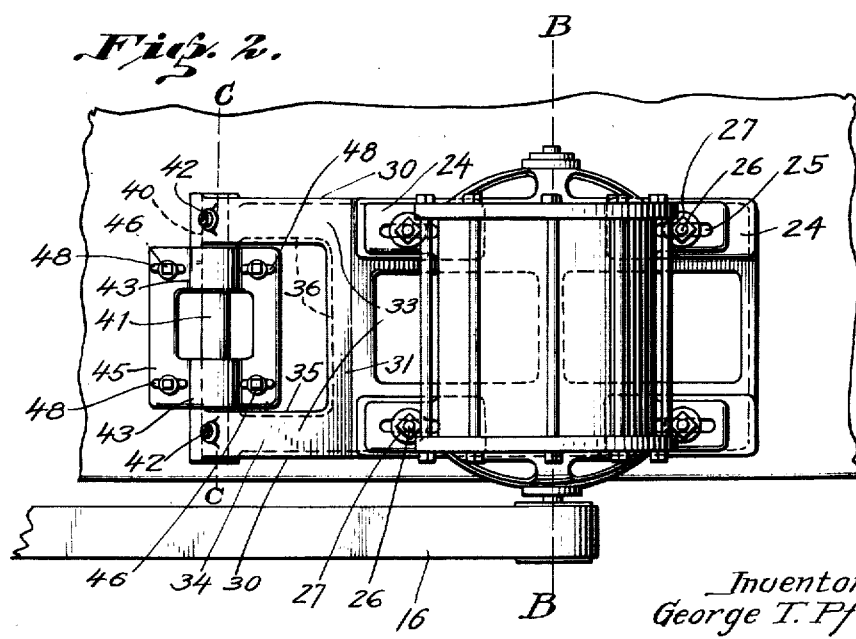
Inventor
George T. Pfleger
By Fred W. Lanier
Attorney Patented May 29, 1934

1,960,506

UNITED STATES PATENT OFFICE 1,960,506

AUTOMATIC BELT-TENSIONING DEVICE

George T. Pfleger, Los Angeles, Calif., assignor, by mesne assignments, to Charles C. Kritzer, Chicago, Ill.

Application February 19, 1929, Serial No. 341,134

4 Claims. (Cl. 308—11)

My invention relates to belt-tensioning devices, and more particularly to a novel form of self-adjusting tensioning device for use on small compressors.

In the field of domestic electric refrigeration, it is desirable to connect a compressor to an electric motor by means of a belt. The belts utilized are ordinarily of a leather or rubber composition to insure quietness, but it has been found that it is necessary to frequently adjust the position of the motor relative to the compressor in order that the belt be maintained taut.

It is an object of my invention to provide a novel motor mounting in which the weight of the motor is utilized to automatically maintain the desired tension on the belt.

It is a further object of this invention to provide a frame which is pivoted between the axes of the pulleys of the motor and compressor, or to one side of these axes, this frame carrying the motor so that the weight thereof places a tension on the belt.

It is necessary to maintain the base of certain types of motors level in order that the bearings will operate properly and be properly lubricated. It is thus necessary that the frame be so positioned that the motor-supporting face thereof be horizontal. In order that this may be accomplished I provide a bearing member for pivoting the frame, this bearing member being adjustable in a direction parallel with the belt, this construction being one of the important features of this invention.

In the preferred form of my invention wherein the bearing member lies between the axes of the driving and driven pulleys, a toggle action is set up tending to align the axes of the motor and compressor pulleys with the axis on which the frame pivots. This toggle action is extremely desirable in maintaining the tension, and would be entirely eliminated if these three axes were to lie in the same plane.

It is an object of this invention to provide a pivoted frame carrying a motor adapted to drive a rotatably mounted driven member, and to provide a stop means for preventing the axis of rotation of the motor shaft from aligning with the pivoting axes of the frame and the driven element.

A further object of my invention is to provide a belt-tensioning device which is automatically adjustable so that no manual tightening or loosening of the belt is necessary in order to compensate for temperature and humidity changes which cause the belt to expand and contract, and to compensate for normal wear and stretch of the belt.

This device also tends to keep a constant tension on the belt which cannot be increased or diminished beyond very narrow limits by the operator, so that the correct tension may be established at the factory which is not susceptible to change by an inexperienced operator. With the common belt-tensioning device where the spacing between the driving and driven member is determined by a screw, the belt may easily be set too tight or too loose by an inexperienced operator.

A further object of my invention is to provide a belt-tensioning device which is automatically adjustable to compensate for wear, stretch, temperature changes, etc.

Further objects and advantages of my invention will be made evident hereinafter.

Referring to the drawing in which I illustrate a preferred embodiment of my invention,—

Fig. 1 is a side elevational view of my belt-tensioning device.

Fig. 2 is a top view of the frame of my device taken in the direction of the arrow 2 of Fig. 1.

My device is particularly applicable to driving an air-compressor 10 mounted on a support 11 and having a driven member in the form of a pulley 12 adapted to be driven by a driving member in the form of a pulley 13 which is keyed to a shaft 14 of a motor 15. The connection between the pulleys 12 and 13 is preferably made by a connecting member in the form of a belt 16, in which case it is necessasry to provide a belt-tensioning means for maintaining the belt taut.

This belt-tensioning means of my invention comprises a frame 20 having a plate portion 21 and a leg portion 22 preferably formed in a single casting. The plate portion 21 has a flat upper face 23 on which the base of the motor 15 rests. Formed in bosses 24 on each corner of the plate portion 21 are longitudinal slots 25 through which bolts 26 extend, these bolts having nuts 27 threaded thereon so as to tightly clamp the motor 15 relative to the frame 20 in a desired longitudinal position. A central web 29 extends transversely across the frame 20 and between a pair of side plates 30 cast integrally with the remainder of the frame 20 and extending downward on each side of the plate portion.

The leg portion 22 has a shelf 31 and legs 33 and 34, the legs and shelf being formed at an obtuse angle relative to the face 23 of the frame 20, as best illustrated in Fig. 1. The legs 33 and 34, and the shelf 31, thus define a saddle 35, the edges of which are reinforced by webs 36 extending downward from the shelf 31 and the legs 33 and 34. The side plates 30 also are formed to extend along the legs 33 and 34, thus making a very solid cast structure for supporting the motor 15.

Formed in the lower end of the legs 33 and 34 is a bore 40 in which a shaft 41 is retained by means of set screws 42. This shaft extends through journal boxes 43 of a bearing member 45. This bearing member 45 is mounted on the support 11 by means of bolts 46 having nuts 47 threaded thereon, these bolts passing through elongated slots 48 formed parallel to the slots 25 and also parallel to the legs 33 and 34 so that the bearing member 45 may be moved toward or away from the compressor 10 and clamped in such a position that the upper face 23 is substantially horizontal when the belt is taut.

As best shown in Fig. 1, the axes of the shaft 41, the driven pulley 12, and the driving pulley 13, are all horizontal, but lie in different planes. For the purpose of further description, the axis of the driven pulley 12 has been termed a "primary axis A", while the axis of the driving member 13 has been termed "axis B". Similarly, the letter "C" represents the axis about which the frame 20 pivots. The position of the axis "C" is between and below the axes "A" and "B" in the preferred embodiment of my invention, so that the motor and frame will tend to pivot about the axis "C" due to the forces of gravity. This rotation is permitted only until the belt 16 becomes taut at which time a force component is exerted in a plane passing through the axes "A" and "B" to counterbalance the weight component tending to turn the frame 20 about the axis "C". This force component becomes larger as the frame 20 moves downward, due to the toggle action caused by this particular placement of the axis. This toggle action insures a taut belt at all times, the tautness being automatically maintained.

To prevent this toggle action from becoming "broken", which would occur when the axis "B" came into alignment with a plane passing through the axes "A" and "C", I provide a stop 50 which is cast integrally with the free end of the frame 20, and which contacts the support 11 before the toggle is "broken". This stop also prevents any damage being done should the belt break and the frame 20 fall, due to the action of gravity.

An additional advantage of this belt-tensioning device is that the belt is tightest when the motor starts when it is pulling the heaviest load. With the common type of belt tightener the tension on the belt is constant at all loads, therefore the belt may slip when the motor is starting and also at peak loads. This is very undesirable as it destroys the belt and wastes power. However, with the belt-tensioning device of my invention the tension on the belt is automatically increased during the starting period and at peak loads. This is accomplished due to the fact that the reverse torque reaction of the motor is such that it increases the toggle action and the distance between the centers of the pulleys on the motor and compressor as the torque exerted by the motor is increased.

The axis "C" need not necessarily be between the axis "A" and axis "B". If axis "C" is to the right of both axis "A" and axis "B" and above a line drawn between axis "A" and axis "B", then as the motor lowers due to the force of gravity the tension on the belt will be increased. When situated this way, the stop is unnecessasry in order to prevent the toggle action from being broken.

An auxiliary feature which may be applied to this invention is a coil spring 52 capped by a dome 53 connected to the center web 29 and resting on the support 11. This spring may be either a compression spring, as shown, in which case it acts against the weight of the motor, or may be a tension spring which will pull downward on the frame 20 and assist the force of gravity in maintaining the belt 16 taut. This spring is not necessary to my invention, but finds a utility in certain installations. This spring also helps to break the fall of the motor should the belt break.

The feature of adjustability of the bearing member 45 relative to the support 11 is an important one, inasmuch as it permits a shifting of the axis of the shaft 41 to maintain the upper face 23 substantially horizontal. This adjustment is used not only in installing the belt-tensioning device, but also during the life of any particular belt, due to the inevitable strength of a belt with age. So also, when replacing a stretched belt with a new one, this feature is indispensable. The adjusting feature between the motor and frame is also important, especially in conjunction with the adjustable bearing member in permitting an increase of the toggle effect between the axis of the shaft 41 and the axis of the drive pulley 13.

I claim as my invention:

1. In combination; a driven member rotatable about a primary axis; a motor-supporting frame pivotally connected with a secondary axis adjustably mounted upon a supporting structure, to permit the distance between the primary and secondary axes to be varied; a motor including a fixed portion adjustably connected with said frame to effect variation of the distance between the axis of the motor shaft and said secondary axis, a drive member, and a power source acting between said fixed portion and said drive member; and a connecting member passing around said drive and driven members; said secondary axis being positioned to one side of a line joining said primary axis and the axis of the drive member, so that a toggle effect is obtained tending to maintain said connecting member taut.

2. In combination; a driven member rotatable about a primary axis; a motor-supporting frame pivotally connected with a secondary axis adjustably mounted upon a supporting structure, to permit the distance between the primary and secondary axes to be varied; a motor including a fixed portion adjustably connected with said frame to adjust the distance between the axis of the motor shaft and said secondary axis, a drive member and a power source acting between said fixed portion and said drive member; and a connecting member passing around said drive and driven members; said secondary axis being positioned to one side of a line joining said primary axis and the axis of the drive member, so that a toggle effect is obtained tending to maintain said connecting member taut, said drive member rotating in a direction causing the forces exerted thereby when in motion to supplement said toggle action.

3. In combination; a driven member rotatable about a primary axis; a motor supporting frame pivotally connected with a secondary axis adjustably mounted upon a supporting structure, to permit the distance between the primary and secondary axes to be varied; an electric motor adjustably connected with said frame to adjust the difference between the axis of the motor shaft and said secondary axis; the rotating member of the motor being provided with a drive member; and a connecting member passing around said drive and driven members; said secondary axis being positioned to one side of a line joining said primary axis and the axis of the drive member, so that a toggle effect is obtained tending to maintain said connecting member taut; said rotating member rotating in a direction causing the forces exerted thereby when transmitting power, to increase said toggle action.

4. In combination; a driven member rotatable about a primary axis; a supporting frame pivotally connected with a secondary axis adjustably mounted upon a supporting structure, to permit the distance between the primary and secondary axes to be varied; a dynamo electric machine connected to said frame; the rotating member of the machine being provided with a drive member; means permitting adjustment of the machine relative to the supporting frame to vary the distance between said secondary axis and the axis of said rotating member; and a connecting member passing around said driven member and said drive member; said secondary axis being positioned to one side of a line joining said primary axis and the axis of the drive member, so that a toggle effect is obtained tending to maintain said connecting member taut; said rotating member rotating in a direction causing the forces exerted thereby when in motion under load, to increase the toggle effect.

GEORGE T. PFLEGER.

CERTIFICATE OF CORRECTION.

Patent No. 1,960,506. May 29, 1934.

GEORGE T. PFLEGER.

It is hereby certified that error appears in the printed specification of the above numbered patent requiring correction as follows: Page 2, line 52, after "starts" insert and; and line 95, for "strength" read stretch; and that the said Letters Patent should be read with these corrections therein that the same may conform to the record of the case in the Patent Office.

Signed and sealed this 24th day of July, A. D. 1934.

Bryan M. Battey (Seal)

Acting Commissioner of Patents.

member of the motor being provided with a drive member; and a connecting member passing around said drive and driven members; said secondary axis being positioned to one side of a line joining said primary axis and the axis of the drive member, so that a toggle effect is obtained tending to maintain said connecting member taut; said rotating member rotating in a direction causing the forces exerted thereby when transmitting power, to increase said toggle action.

4. In combination; a driven member rotatable about a primary axis; a supporting frame pivotally connected with a secondary axis adjustably mounted upon a supporting structure, to permit the distance between the primary and secondary axes to be varied; a dynamo electric machine connected to said frame; the rotating member of the machine being provided with a drive member; means permitting adjustment of the machine relative to the supporting frame to vary the distance between said secondary axis and the axis of said rotating member; and a connecting member passing around said driven member and said drive member; said secondary axis being positioned to one side of a line joining said primary axis and the axis of the drive member, so that a toggle effect is obtained tending to maintain said connecting member taut; said rotating member rotating in a direction causing the forces exerted thereby when in motion under load, to increase the toggle effect.

GEORGE T. PFLEGER.

CERTIFICATE OF CORRECTION.

Patent No. 1,960,506. May 29, 1934.

GEORGE T. PFLEGER.

It is hereby certified that error appears in the printed specification of the above numbered patent requiring correction as follows: Page 2, line 52, after "starts" insert and; and line 95, for "strength" read stretch; and that the said Letters Patent should be read with these corrections therein that the same may conform to the record of the case in the Patent Office.

Signed and sealed this 24th day of July, A. D. 1934.

Bryan M. Battey (Seal) Acting Commissioner of Patents.